US012732044B2

(12) United States Patent
Tardy et al.

(10) Patent No.: US 12,732,044 B2
(45) Date of Patent: Sep. 8, 2026

(54) LIQUID COOLING MACHINE

(71) Applicant: NIDEC PSA EMOTORS, Carrieres sous Poissy (FR)

(72) Inventors: Guillaume Tardy, La Celle St Cloud (FR); Diana Fantuz, Plaisir (FR)

(73) Assignee: NIDEC PSA EMOTORS, Carrieres sous Poissy (FR)

( * ) Notice: Subject to any disclaimer, the term of this patent is extended or adjusted under 35 U.S.C. 154(b) by 201 days.

(21) Appl. No.: 17/775,513

(22) PCT Filed: Nov. 4, 2020

(86) PCT No.: PCT/FR2020/051988
§ 371 (c)(1),
(2) Date: May 9, 2022

(87) PCT Pub. No.: WO2021/094670
PCT Pub. Date: May 20, 2021

(65) Prior Publication Data

US 2022/0399770 A1 Dec. 15, 2022

(30) Foreign Application Priority Data

Nov. 14, 2019 (FR) ...................................... 1912738

(51) Int. Cl.
*H02K 1/32* (2006.01)
*H02K 1/276* (2022.01)
*H02K 9/19* (2006.01)
*H02K 21/14* (2006.01)

(52) U.S. Cl.
CPC ............... *H02K 1/32* (2013.01); *H02K 1/276* (2013.01); *H02K 9/19* (2013.01); *H02K 21/14* (2013.01)

(58) Field of Classification Search
CPC ................................ H02K 1/32; H02K 1/276; H02K 9/19; H02K 21/14; H02K 1/2766; H02K 7/003
See application file for complete search history.

(56) References Cited

U.S. PATENT DOCUMENTS

2010/0194220 A1 8/2010 Tatematsu et al.
2011/0309697 A1 12/2011 Kirley, Jr. et al.
2013/0334912 A1* 12/2013 Tokunaga ................ H02K 9/19 310/54

(Continued)

FOREIGN PATENT DOCUMENTS

JP 2003324901 11/2003
JP 2010239799 A 10/2010
JP 2019161750 A 9/2019

OTHER PUBLICATIONS

International Search Report for PCT/FR2020/051988 mailed Feb. 15, 2021.
Written Opinion for PCT/FR2020/051988 mailed Feb. 15, 2021.

*Primary Examiner* — Christopher M Koehler
*Assistant Examiner* — Riley Owen Stout
(74) *Attorney, Agent, or Firm* — Sandberg Phoenix & von Gontard, PC

(57) ABSTRACT

The invention relates to a rotary electric machine with liquid cooling, comprising a rotor with permanent magnets and a wound stator, the rotor comprising: (i) at least one rotor sheet stack, (ii) magnets housed in the sheet stack, and (iii) front and rear flanges adjacent to the sheet stack, the machine being configured to enable a cross-flow of the cooling liquid within the rotor sheet stack.

17 Claims, 3 Drawing Sheets

(56) References Cited

U.S. PATENT DOCUMENTS

| | | | | |
|---|---|---|---|---|
| 2017/0063191 | A1* | 3/2017 | Kirkley, Jr. | F16C 35/045 |
| 2017/0310179 | A1* | 10/2017 | Okouchi | H02K 1/2766 |
| 2019/0068012 | A1 | 2/2019 | Yazaki | |
| 2019/0207451 | A1* | 7/2019 | Yoshizawa | H02K 1/276 |
| 2019/0229571 | A1 | 7/2019 | Yasuda | |
| 2021/0135533 | A1* | 5/2021 | Samie | H02K 1/276 |

* cited by examiner

LIQUID COOLING MACHINE

CROSS-REFERENCE TO RELATED APPLICATIONS

This application is the US National Stage under 35 USC § 371 of International Application No. PCT/FR2020/051988 filed 4 Nov. 2020 which claims priority to French Application No. 1912738 filed 14 Nov. 2019, both of which are incorporated herein by reference.

BACKGROUND

The present invention relates to rotary electric machines, and more particularly those cooled by a circulation of a liquid, in particular oil, circulating at least partially along the shaft of the machine.

The invention relates more particularly to synchronous or asynchronous AC machines. It relates in particular to traction or propulsion machines for electric motor vehicles (Battery Electric Vehicle) and/or hybrid motor vehicles (Hybrid Electric Vehicle-Plug-in Hybrid Electric Vehicle), such as individual cars, vans, trucks or buses. The invention also applies to rotary electric machines for industrial and/or energy production applications, in particular naval, aeronautical or wind power applications.

It is known to cool the coil heads of the stator by a cooling liquid ejected by the rotor onto the coil heads during operation of the machine.

Application JP2003324901 describes a permanent magnet rotor machine in which the cooling liquid is brought to the rotor through an axial channel, centered on the axis of rotation, and circulates through radial channels to other channels extending axially along the magnets to cool them. The liquid leaves the rotor at the end of these magnet cooling channels to be projected onto the heads of the stator coils. The rotor has a particular arrangement, with a peripheral ring being connected in the middle to the shaft.

Application US2010/0194220 discloses another liquid cooling machine, involving circulation of liquid within the rotor to cool the magnets. This application mentions a risk of the insulation being stripped from the coil heads by the cooling liquid in the event of spraying on the coil heads. To reduce this risk, the rotor comprises end pieces attached to the rotor sheet stack, together forming a passage for the liquid, this passage opening outward via outlets located radially set back from the radially outer surface of the rotor. Such an arrangement increases the number of component parts of the machine and complicates its production. In addition, less cooling of the coil heads is penalizing in terms of the performance thereof.

US 2019/0068012 discloses a rotor cooled by liquid circulation. The latter is discharged via through openings made in end plates.

SUMMARY

The invention aims to improve the cooling of electric machines cooled by liquid circulation.

To meet this need, disclosed is a rotary electric machine with liquid cooling, the machine comprising a rotor with magnets and a wound stator, the rotor comprising:

(i) at least one rotor sheet stack, (ii) magnets housed in said sheet stack, (iii) front and rear plates adjacent to said sheet stack, the machine being configured to enable a cross-flow of the cooling liquid within the rotor sheet stack.

In particular, the liquid can circulate in cooling channels of the rotor sheet stack that are angularly offset around the axis of rotation, the cooling channels in which the liquid circulates toward the rear preferably alternating with those in which the liquid circulates toward the front, these cooling channels preferably being parallel and associated with respective poles of the rotor.

Preferably, the machine provides a supply of cooling liquid to front and rear plates, the liquid supplying the front plate circulating from the front plate through the sheet stack via at least one cooling channel toward the rear plate before leaving the rotor via at least one discharge channel delimited at least partially by the rear plate, and the liquid supplying the rear plate circulating from the rear plate toward the front plate via at least one channel for cooling the sheet stack before leaving the rotor via at least one discharge channel delimited at least partially by the front plate.

The discharge channels preferably open opposite the coil heads of the stator, in order to allow the projected liquid to cool the coil heads.

This allows the machine to be cooled while limiting the force with which the cooling fluid impacts the stator. The manufacture of the machine remains simple, and the plates can be made simply, if desired, in one piece. This cooling system allows balanced cooling to be obtained along the longitudinal axis of the machine.

The front plate may be the one that is located on the side of the rotor shaft that engages mechanically with the driven elements, and this side of the shaft may comprise a drive pinion, for example machined with the shaft.

Preferably, the front and rear plates each bear axially against said rotor sheet stack at one end. Thus, the aforementioned discharge channels can be formed hollow on the face of the plate facing said rotor sheet stack.

Each plate may comprise at least one supply channel through which the liquid supplying the plate reaches at least one cooling channel. This supply channel can be formed hollow on the face of the plate facing the rotor sheet stack. The supply channels can each have a Y or T shape, or any other suitable shape.

Preferably, the front and rear plates are identical and angularly offset so as to supply different cooling channels, the cooling channels traversed by the liquid flowing from the front plate to the rear plate preferably being made within odd poles, and those traversed by the liquid in the opposite direction preferably being located within even poles.

Preferably, the cooling channels are formed by housings receiving magnets, by the space left free by the magnet(s) in these housings. This space left free can in particular be used to channel the magnetic flux in the sheets of the stack.

As a variant, the cooling channels may be other than housings receiving magnets. The cooling channels can for example be formed in recesses used only for cooling, or for other uses, for example for the manufacturing method.

Preferably, the discharge channels have an outwardly flared shape. The discharge channels can be formed by recesses whose depth increases toward the outer periphery of the plate. Each discharge channel may have a substantially trapezoidal shape. The shape of the discharge channels can limit the liquid ejection velocity while allowing a large area of the stator coil heads to be sprayed.

Preferably, the supply and discharge channels alternate in the circumferential direction on each plate.

The plates can be supplied via the shaft of the rotor, with the rotor possibly comprising a central channel and radial channels opening onto the aforementioned supply channels of the front and rear plates. The radial channels supplying the front plate can be offset angularly with respect to those supplying the rear plate, to take account of the angular offset between the plates.

The machine may comprise at least one axial channel for distributing the cooling fluid to the plate(s), which may be formed in the rotor mass or between the rotor mass and the shaft, along the shaft. This or these axial distribution channel (s) can axially cross at least part of the rotor mass. These axial distribution channels can for example be provided in the sheet stack and extend flush with the shaft.

The plates can be supplied with cooling liquid through an axial cooling liquid distribution channel formed in the rotor mass along the shaft.

Preferably, each plate is a casting, in particular made of aluminum or aluminum alloy. The geometry of the plate, with the supply or discharge channels formed at the interface between the plate and the rotor sheet stack, allows very simple manufacture without re-machining or drilling. Materials other than aluminum can be used, for example other less magnetic materials.

Also disclosed is a method for cooling a rotary electric machine, the rotor of which comprises a sheet stack and magnets housed therein, and the rotor of which rotates within a stator having coil heads, in particular a machine as defined above, in which the liquid is circulated in opposite directions within the rotor to cool the magnets, then the liquid is projected onto the coil heads of the stator after passing through the rotor sheet stack. The circulation through the sheet stack can in particular take place crosswise over the entire length of the sheet stack, this circulation taking place between the front and rear plates.

The method allows the stator to be cooled while limiting the force with which the cooling fluid impacts the stator. The enlarged section of the discharge channel outlets prevents the formation of a powerful jet directed toward the stator. Preferably, the liquid circulates axially within the stack, then is ejected radially. The elbow formed at the junction between the rotor sheet stack and the plates breaks the flow, and thus reduces the speed with which the liquid impacts the coils.

Preferably, the cooling fluid is circulated axially within the rotor sheet stack through recesses thereof made in the housings of the magnets. Also preferably, all the odd poles are cooled by circulation in one direction and all the even poles by circulation in the opposite direction.

BRIEF DESCRIPTION OF THE DRAWINGS

The invention will be better understood upon reading the following description of a non-limiting embodiment thereof, and on examining the appended drawings, in which.

DETAILED DESCRIPTION

Figure 1:
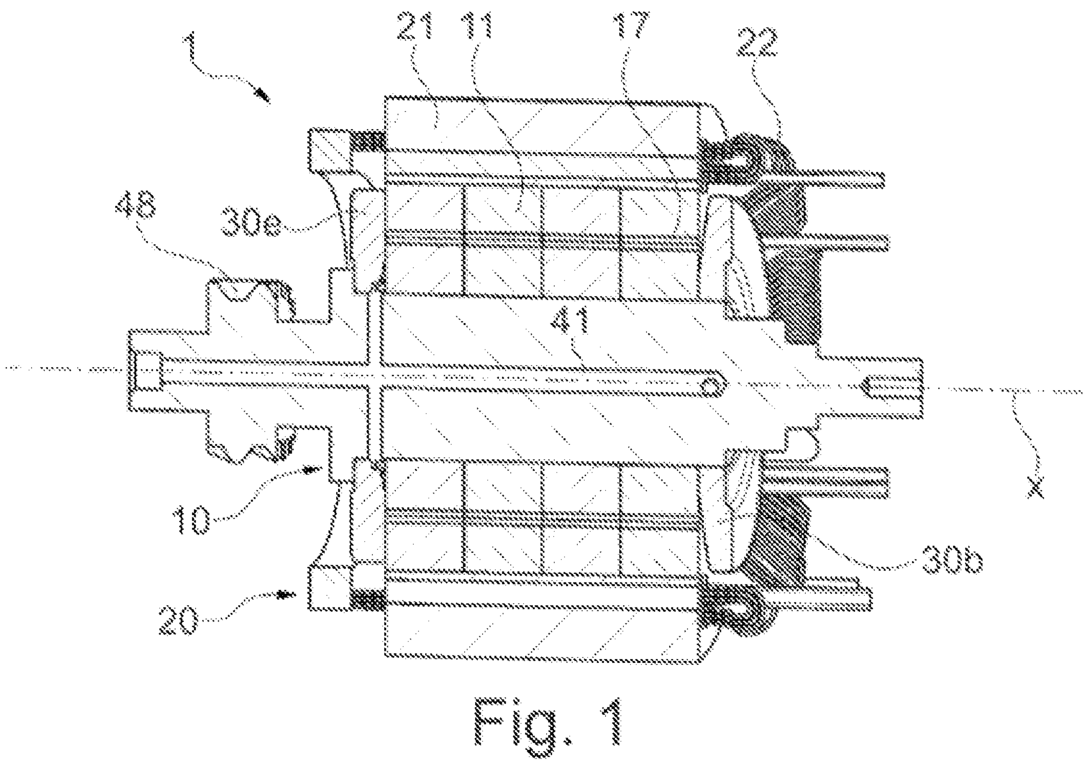
FIG. 1 partially and schematically shows, in longitudinal section, a rotary electrical machine.

The electric machine 1 according, partially shown in FIG. 1, comprises a rotor 10 rotating inside a stator 20 about an axis of rotation X.

The stator 20 comprises a stack 21 of stator sheets providing notches for electrical conductors of a winding. These conductors protrude axially from the sheet stack 21 to form coil heads 22, also called lead-out wires.

The rotor 10 comprises at least one rotor sheet stack 11 carried by a shaft 40 that is guided by bearings (not shown). This shaft 40 carries a pinion 48 at the front, which meshes with driven elements, not shown. The end of the shaft 40 carrying the pinion 48 is also called "drive end."

Figures 3, 4:
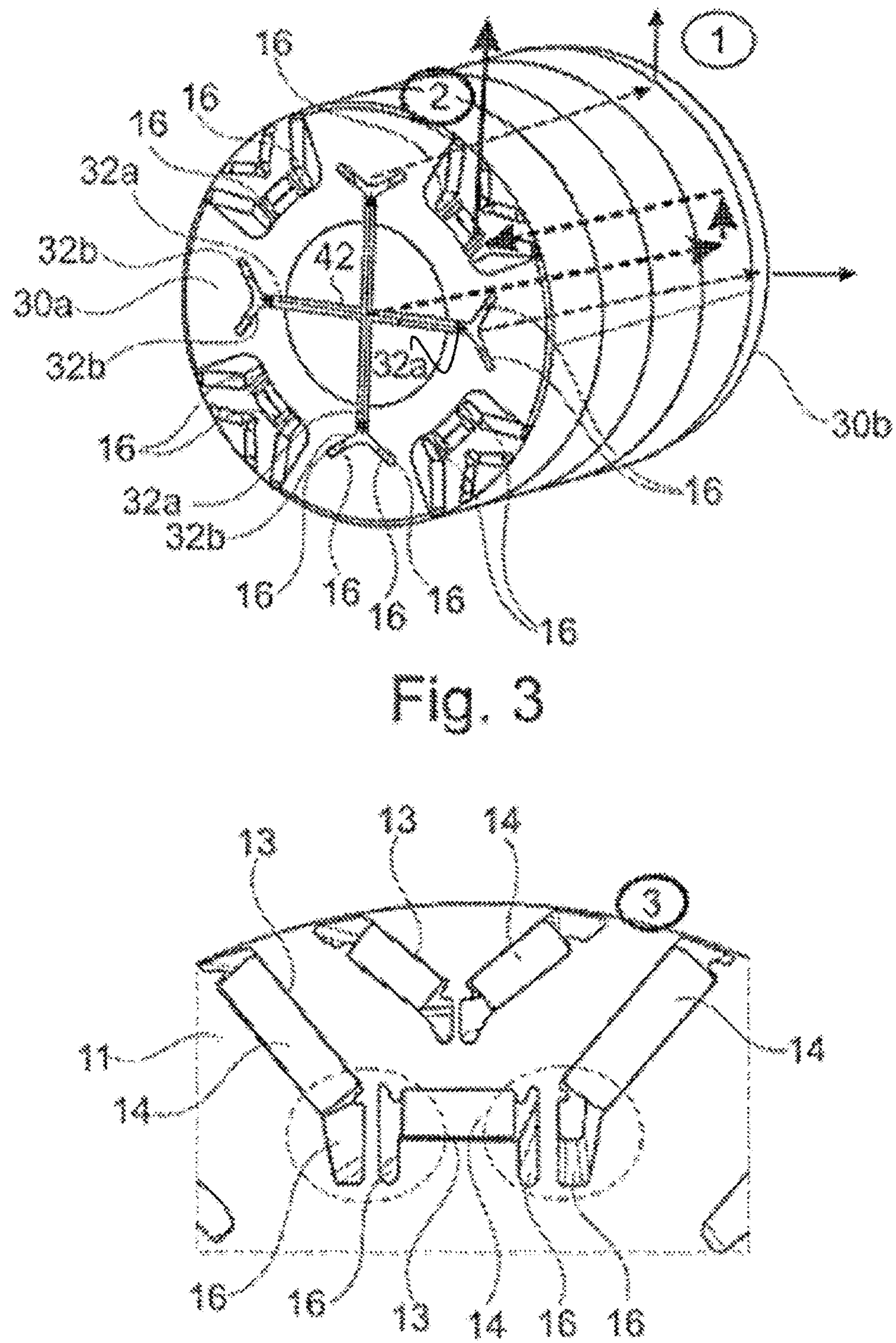
FIG. 4 shows a detail of the rotor sheet stack.

As shown in FIG. 4, the stack 11 comprises housings 13 in which permanent magnets 14 are arranged, the magnetization of which can be carried out if necessary after they are installed in the housings 13.

The rotor 10 comprises two front and rear end plates 30*a* and 30*b* arranged against the corresponding ends of the stack 11.

Figure 5:
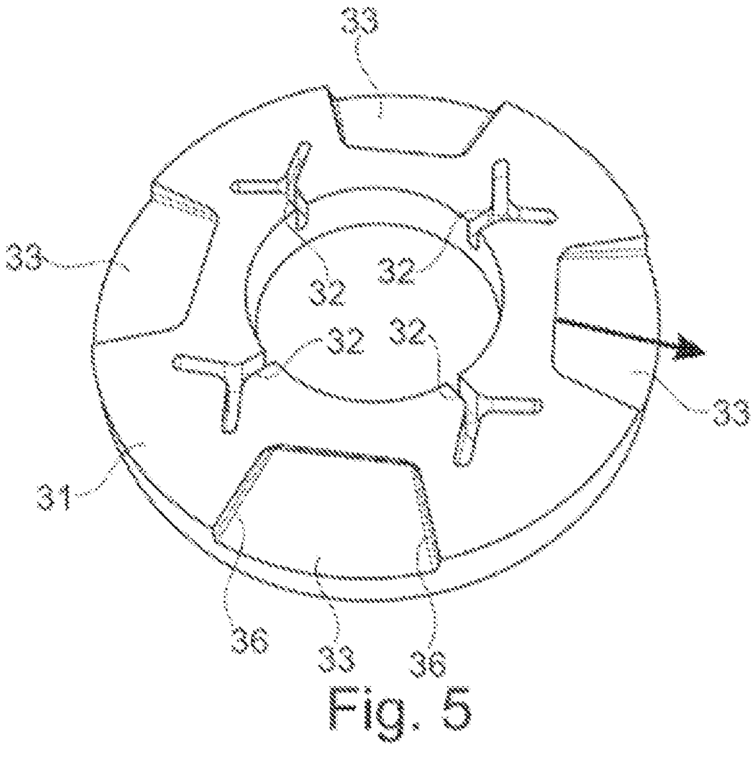
FIG. 5 shows a plate in isolation.

The two plates 30*a* and 30*b* are identical in the example considered, and as illustrated in FIG. 5, on their face 31 facing the stack 11, have a set of recessed reliefs defining circulation passages for a cooling fluid.

Figure 2:
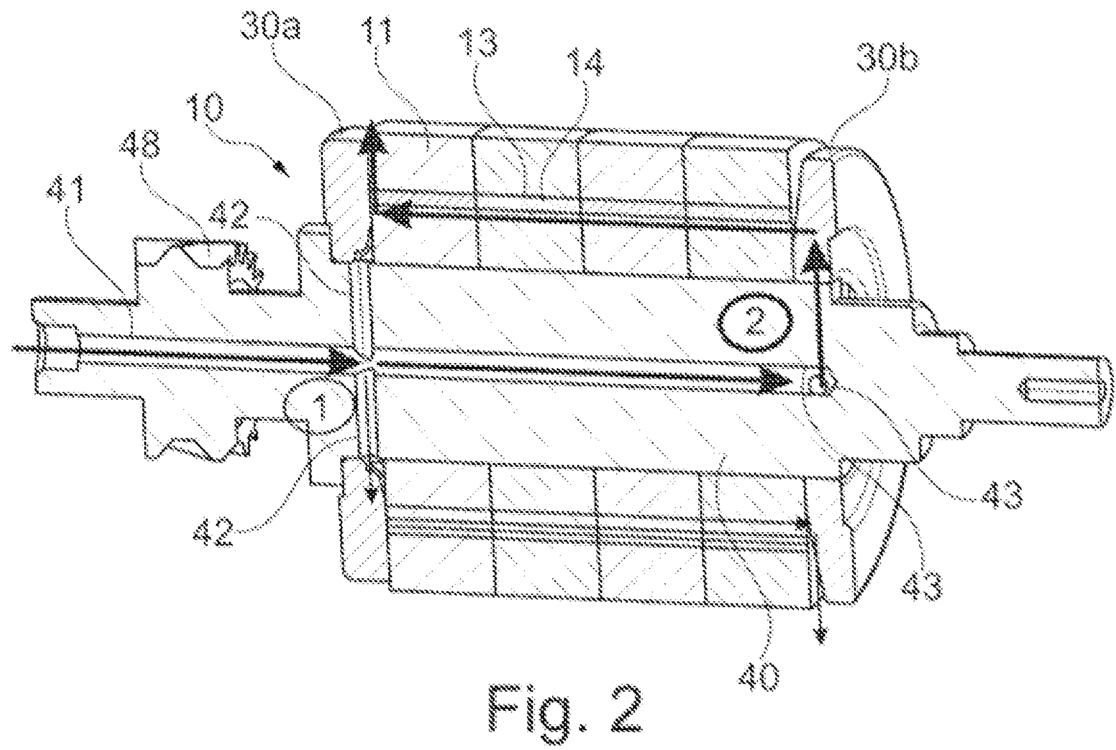
FIG. 2 shows the rotor of the machine of FIG. 1 in isolation, and illustrates the circulation of the cooling fluid in opposite directions within the rotor sheet stack, FIG. 3 partially and schematically shows the rotor, showing a plate in cross-section in its thickness.

This cooling fluid, which is preferably an oil, is brought through a central channel 41 of the shaft 40, as illustrated in FIG. 2.

This channel 41 communicates with the front plate 30*a* by radial channels 42 and with the rear plate 30*b* by other radial channels 43, of which in FIG. 2 we see only the opening into the central channel 41, these channels 43 being angularly offset from the channels 42.

In reference to FIG. 5, one sees that each plate 30*a* or 30*b* comprises supply channels 32 in the general shape of a Y and discharge channels 33 that alternate with the supply channels 32 and lead to the outer periphery of the plate.

As shown in FIG. 3, the supply channels 32 each have a radial branch 32*a* that is aligned with a radial channel 42 of the shaft 40 and opens onto the latter, and two oblique branches 32*b* in which the flow of liquid circulating in the branch 32*a* is distributed.

Figure 6:
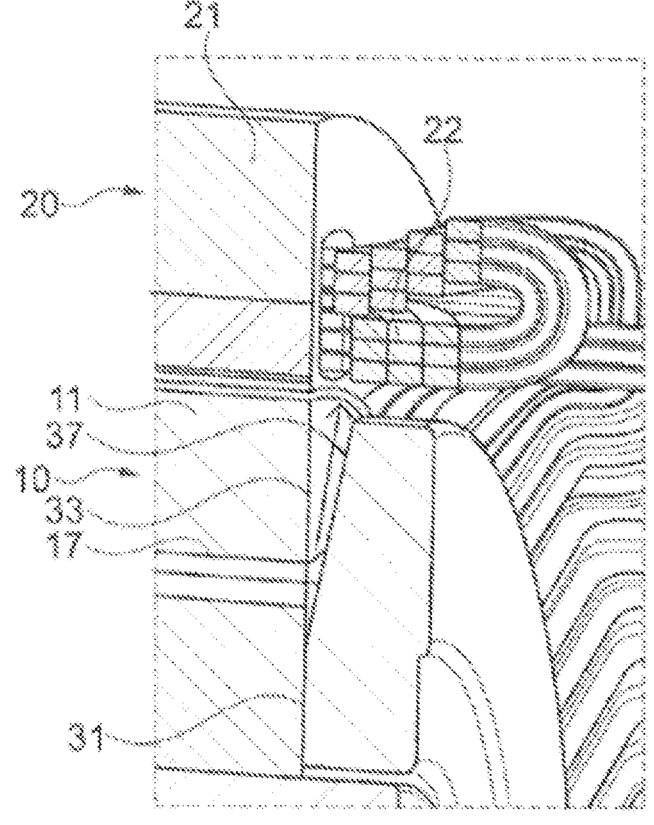
FIG. 6 illustrates the cooling of the coil heads by the liquid projected by the discharge channels of the plates thereon.

The branches 32*b* overlap at least partially with recesses 16 made in the sheets of the stack 11, and forming longitudinal cooling channels 17 through the stack 11, as illustrated in FIGS. 1 and 6.

The recesses 16 are made by cutting the sheets with the housings 13 of the magnets 14, and serve on the magnetic plane to channel the magnetic flux in the sheets of the stack 11. The discharge channels 33 are superimposed on the recesses 16 of the poles located between those that are supplied by the supply channels 32.

In the example considered, the rotor has 8 poles, and each plate 30*a* or 30*b* has four supply channels 32 and four discharge channels 33.

The plates 30*a* and 30*b* are angularly offset by 45° in the example considered.

Thus, the channels 17 formed within the stack 11 by the recesses 16 of the odd poles are superimposed at one end on the supply channels 32 of the front plate 30*a* and on the discharge channels 33 of the rear plate 30*b*, and the channels 17 formed by the recesses of the even poles overlap at one end with the discharge channels 33 of the front plate 30*a* and at the opposite end with the supply channels 32 of the rear plate 30*b*.

This allows circulations of the cooling liquid in opposite directions to be created within the rotor.

More precisely, as illustrated in FIGS. 2 and 3, the liquid arriving via the central channel 41 can reach the front plate 30*a* via the radial channels 42, then reach the channels 17 of the odd poles via the supply channels 32 and circulate from the front to the rear within the sheet stack (circle marked 1 in FIGS. 2 and 3), before reaching the discharge channels 33 of the rear plate 30*b*.

The liquid that does not pass through the channels 42 reaches the channels 43 by circulating along the central passage 41, then reaches the rear plate 30*b* and the supply channels 32 of the latter. The liquid then flows from the rear to the front in the channels 17 of the even poles (circle marked 2 in FIGS. 2 and 3), before reaching the discharge channels 33 of the front plate 30*a*.

Each discharge channel 33 has a substantially trapezoidal general shape, with opposite side edges 36 that diverge outwardly, as illustrated in FIG. 5.

The angular expanse occupied on the periphery of the plate by a discharge channel 33 is for example greater than or equal to 30° about the axis X.

The depth of the discharge channel 33, that is to say, the distance by which it is recessed with respect to the plane of the face 31 of the plate, can increase as illustrated in FIG. 6 with the distance to the center of the plate.

In FIG. 6, one can see that the bottom 37 of the discharge channel 33 has a planar shape inclined obliquely away from the stack 11.

The angular width of the outlet of the discharge channel 33, as well as the slope of its bottom 37, allow a large portion of the coil heads 22 to be sprinkled with the cooling liquid, as illustrated in FIG. 6.

The plates 30*a* and 30*b* are preferably made by casting, in aluminum or aluminum alloy, and can be held against the stack 11 by tie rods, not shown.

The faces 31 of the plates 30*a* and 30*b* advantageously come to cover the magnets 14 and thus contribute to their axial immobilization within the stack 31.

The operation of the machine is as follows.

During the rotation of the rotor 10, the cooling liquid circulates in the opposite direction within the sheet stack, as explained above, and cools the magnets. The liquid leaving the channels 17 provided within the stack 11 is sprayed by the discharge channels 33 on the coil heads 22 due to centrifugal force.

In view of the widened section of the outlets of the discharge channels 33, the formation of high-pressure fine jets is avoided, the impact of which on the coil heads would be likely to damage them.

In the example considered, the presence of the bend formed at the junction between the axial cooling channels 17 and the radial discharge channels 33 slows down the liquid and further reduces the impact speed on the coil heads.

The cooling fluid sprayed on the stator can be recovered and pumped outside the stator to be cooled before being reinjected through the hollow shaft 40.

Of course, the claimed invention is not limited to the example that has just been described.

The rotor may or may not be twisted.

The rotor can be made with other passages for the cooling fluid. The angular offset between the plates can be different from 45°, depending on the polarity of the machine.

In general, this offset can be 360°/n plus the possible twist angle of the rotor, where n designates the number of poles of the rotor. It can for example be 60° for a 6-pole machine.

Preferably, all the poles are cooled, but as a variant only some of them are, for example one pole out of two or one out of four.

The plates may have a shape other than that illustrated.

The invention claimed is:

1. A rotary electric machine with liquid cooling, comprising a rotor with magnets and a wound stator, the rotor comprising:

(i) at least one rotor sheet stack around a shaft of the rotor, the electric machine comprising axial cooling channels extending through the rotor sheet stack;

(ii) magnets housed in said sheet stack;

(iii) front and rear plates adjacent to said sheet stack, said front and rear plates each defining at least one supply channel and at least one discharge channel, said at least one supply channel of the front plate and of the rear plate being in fluid communication with a source of cooling liquid, the front and rear plates each coming to bear axially against said rotor sheet stack at one end, and the discharge channels being formed hollow on the face of the plate turned toward said rotor sheet stack, the discharge channels being formed by recesses whose depth, measured in an axial direction, increases toward the outer periphery of the front and rear plates, wherein the cooling liquid is configured to leave the rotor via the discharge channels;

wherein, a first one of said axial cooling channels is in fluid communication with the at least one supply channel in said front plate and the at least one discharge channel in said rear plate to allow flow of cooling liquid from said front plate to said rear plate; and wherein, a second one of said axial cooling channels is in fluid communication with the at least one supply channel in said rear plate and the at least one discharge channel in said front plate to allow flow of cooling liquid from said rear plate to said front plate;

whereby, the machine is configured to enable a cross-flow of the cooling liquid within the rotor sheet stack.

2. The machine according to claim 1, (i)

(ii)

(iii)

wherein, the plates are supplied with cooling liquid by a shaft of the rotor, the shaft comprising a central channel and radial channels, this central channel communicating with the front plate by some of the radial channels and with the rear plate by other of the radial channels, the front and rear plates comprising supply channels having radial branches that are aligned with the radial channels of the shaft and open onto the radial channels of the shaft.

3. The machine according to claim 1, (i)

(ii)

(iii)

wherein the plates are supplied with cooling liquid via an axial distribution channel of the cooling liquid formed in the rotor mass along a shaft, the shaft being devoid of non-axial channels situated axially within the length of the sheet stack measured in the axial direction.

4. The machine according claim 1, each plate comprising at least one supply channel through which the liquid supplying the plate reaches at least one cooling channel.

5. The machine according to claim 4, the supply channel being formed hollow on the face of the plate facing the rotor sheet stack.

6. The machine according to claim 4, the supply channels each have a Y or T shape.

7. The machine according claim 1, the front and rear plates being identical and angularly offset so as to supply different cooling channels.

8. The machine according to claim 7, the cooling channels traversed by the liquid flowing from the front plate to the rear plate being made within odd poles, and/or those traversed by the liquid in the opposite direction being located within even poles.

9. The machine according to claim 1, the sheet stack defining housings which receive magnet(s); the cooling channels being formed by space left free by the magnet(s) in these housings.

10. The machine according to claim 1, the discharge channels being formed by recesses whose depth increases on approaching the outer periphery of the plate.

11. The machine according to claim 1, the supply and discharge channels alternating in the circumferential direction on each plate.

12. The machine according to claim 1, each discharge channel having a substantially trapezoidal shape.

13. The machine according to claim 1, the supply of the plates being done by the shaft of the rotor.

14. The machine according to claim 1, the discharge channels emerging opposite the coil heads of the stator.

15. The machine according to claim 1, each plate being a casting.

16. The machine as defined in claim 1, wherein the liquid is circulated in opposite directions within the rotor to cool the magnets, then the liquid is projected onto the coil heads of the stator after passing through the rotor sheet stack.

17. The machine as defined in claim 2, the central channel being branched to the radial channels only at axial positions of the shaft situated outside the length of the rotor sheet stack in the axial direction.

* * * * *